(12) United States Patent
Harding

(10) Patent No.: US 8,758,878 B2
(45) Date of Patent: Jun. 24, 2014

(54) METHOD FOR REDUCING ADHESION BETWEEN POLYMER BODIES

(75) Inventor: Weston F. Harding, Lehi, UT (US)

(73) Assignee: Becton, Dickinson and Company, Franklin Lakes, NJ (US)

(*) Notice: Subject to any disclaimer, the term of this patent is extended or adjusted under 35 U.S.C. 154(b) by 651 days.

(21) Appl. No.: 13/042,120

(22) Filed: Mar. 7, 2011

(65) Prior Publication Data
US 2012/0231219 A1  Sep. 13, 2012

(51) Int. Cl.
*B32B 3/00* (2006.01)

(52) U.S. Cl.
USPC .................. 428/156; 428/141; 428/166

(58) Field of Classification Search
USPC ........ 428/40.1, 156, 141, 167, 166, 172, 343, 428/99
See application file for complete search history.

(56) References Cited

U.S. PATENT DOCUMENTS

| | | | |
|---|---|---|---|
| 4,963,388 A | 10/1990 | Benoit | |
| 5,959,006 A | 9/1999 | Pungtrakul | |
| 2011/0016675 A1* | 1/2011 | Mayers et al. | 24/450 |
| 2011/0046570 A1 | 2/2011 | Stout et al. | |

OTHER PUBLICATIONS

U.S. Appl. No. 12/880,649, filed Sep. 13, 2010, Stout et al.
U.S. Appl. No. 13/042,073, filed Mar. 7, 2011, Stout.
U.S. Appl. No. 13/042,114, filed Mar. 7, 2011, Stout et al.

* cited by examiner

*Primary Examiner* — Catherine A Simone
(74) *Attorney, Agent, or Firm* — Jeanne Lukasavage; Craig Metcalf; Kirton McConkie

(57) ABSTRACT

A device is disclosed that includes a first polymer body having tacky properties. The first polymer body has a substantially-flat exterior surface. One or more protrusions are disposed on the substantially-flat exterior surface of the first polymer body. When the one or more protrusions are in contact with a substantially-flat exterior surface of a second polymer body having tacky properties, the adhesive force between the one or more protrusions and the substantially-flat exterior surface is less than the force of gravity on the first polymer body.

19 Claims, 9 Drawing Sheets

METHOD FOR REDUCING ADHESION BETWEEN POLYMER BODIES

BACKGROUND

Some polymer materials can be naturally tacky, or slightly sticky. When very small tacky polymer bodies are collected together they can tend to stick together and form clusters. This tendency to cluster possesses challenges to assembly and manufacturing processes in which polymer bodies must be handled individually. Traditionally, this problem was addressed by adding a powder or lubricant to the very small polymer bodies that could reduce the tackiness of the bodies, causing them to separate. Other solutions have involved mechanically or manually separating the individual parts.

Examples of tacky polymer materials include silicone rubber, latex rubber, synthetic latex rubber, and thermoplastic elastomers (TPE). Referring to silicone rubber as a representative material, silicone rubber is a rubber-like material composed of silicone together with carbon, hydrogen, and oxygen. Silicone rubber can be found in a wide variety of products, including automotive applications, electronics, medical devices and implants, and more. Some of these application use silicon rubber parts, which may include the assembly and manufacture problems mentioned above.

SUMMARY

The devices and methods of the present disclosure have been developed in response to problems and needs in the art that have not yet been fully resolved by currently available tacky polymer bodies. Thus, these devices and methods are developed to reduce the adhesive force between adjacent tacky polymer bodies. Specifically, by including one or more protrusions on a substantially flat, exterior surface of a tacky polymer body, the contact surface area between adjacent bodies is reduced, which can prevent the adhesion therebetween.

One aspect of the present invention provides a device that includes a first polymer body having tacky properties. The first polymer body has a substantially-flat exterior surface. One or more protrusions are disposed on the substantially-flat exterior surface of the first polymer body. When the one or more protrusions are in contact with a substantially-flat exterior surface of a second polymer body having tacky properties, the adhesive force between the one or more protrusions and the substantially-flat exterior surface is less than the force of gravity on the first polymer body.

Implementations can include one or more of the following aspects. The polymer body may be an elastomeric body. The adhesive force between a substantially-flat exterior surface of the first polymer body and a substantially-flat exterior surface of the first polymer body may be between approximately 0.01 to 0.04 grams force/mm². The polymer body may comprise a material selected from a group consisting of silicone rubber, latex rubber, synthetic latex rubber, and a thermoplastic elastomer. The polymer body may consist essentially of a material selected from a group consisting of silicone rubber, latex rubber, synthetic latex rubber, and a thermoplastic elastomer. The one or more protrusions may include three or more protrusions. The one or more protrusions may be rounded bumps. The one or more protrusions may form angled points. The first polymer body may have a weight of less than 0.1 grams. The first polymer body may have a weight of less than 0.01 grams. The first polymer body may be a septum. The substantially-flat exterior surface of the first polymer body may have a surface area, and the one or more protrusions may have a combined footprint with a surface area, wherein the surface area of the combined footprint of the one or more protrusions may be less than 10% the surface area of the substantially-flat exterior surface of the first polymer body. The volumes of the first polymer body may be less than 0.1 mm³. A lubricant may be disposed on the first polymer body.

In another aspect, a device includes a first polymer body having tacky properties. The first polymer body having a substantially-flat exterior surface. One or more protrusions is disposed on the substantially-flat exterior surface of the first polymer body, wherein when the one or more protrusions are in contact with a substantially-flat exterior surface of a second polymer body having tacky properties the adhesive force between the one or more protrusions and the substantially-flat exterior surface is less than two times the force of gravity on the first polymer body.

Implementations can include one or more of the following aspects. The polymer body may comprise a material selected from the group consisting of silicone rubber, latex rubber, synthetic latex rubber, and a thermoplastic elastomer.

In another aspect, a method for reducing adhesion between two polymer bodies, the method includes: Providing a first body having a substantially-flat exterior surface. Providing a second body having a substantially-flat exterior surface. The first body and the second body comprising a polymer material. Providing one or more protrusions on the substantially-flat exterior surface of the first body. When the one or more protrusions are in contact with the substantially-flat exterior surface of the second body, the adhesive force between the one or more protrusions and the substantially-flat exterior surface is less than the force of gravity on the first body or the second body.

Implementations can include one or more of the following aspects. The polymer body may be an elastomeric body. The adhesive force between a substantially-flat exterior surface of the first polymer body and a substantially-flat exterior surface of the first polymer body may be between approximately 0.01 to 0.04 grams force/mm². The polymer body may comprise a material selected from the group consisting of silicone rubber, latex rubber, synthetic latex rubber, and a thermoplastic elastomer.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

FIGS. 7A-7F illustrate top views of different embodiments of protrusions.

DETAILED DESCRIPTION OF THE INVENTION

Embodiments of the present invention will be best understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

Figure 1:
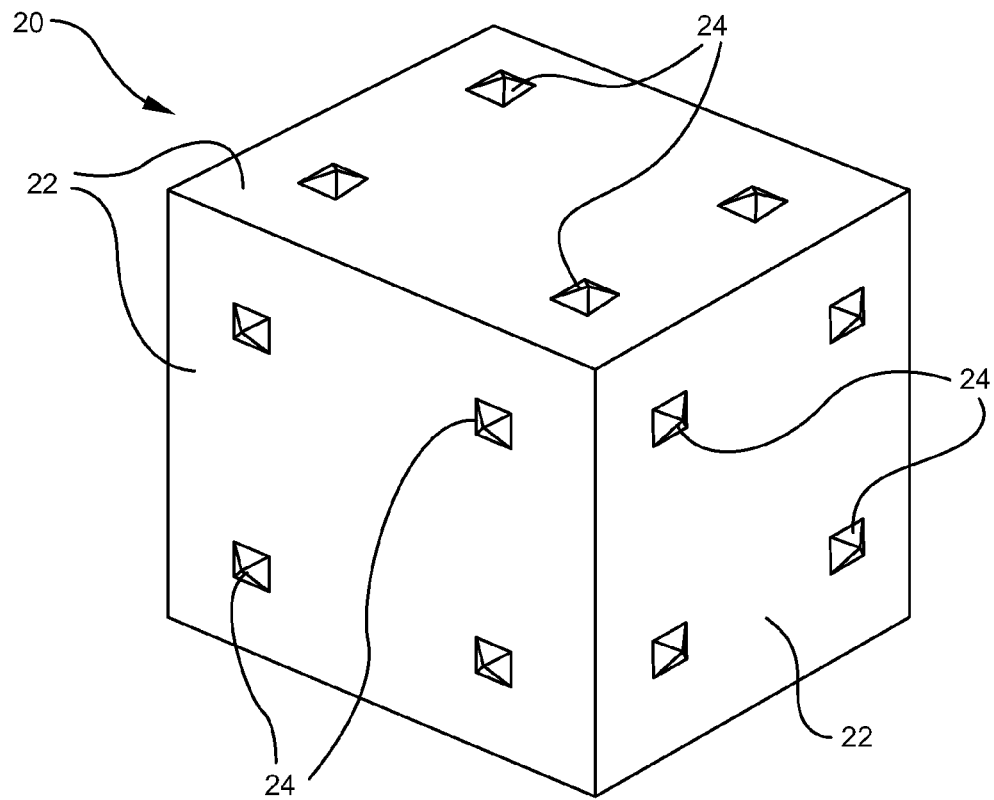
FIG. 1 illustrates a perspective view of a polymer body having a plurality of protrusions, according to some embodiments.

Referring to FIG. 1, which illustrates a body 20 having one or more substantially-flat, exterior surfaces 22. The body 20 can have many various shapes and be configured for various uses. For instance, the body can be a septum that is inserted into an intravenous therapy catheter device for use as a valve therein. In other embodiments, the body 20 can be a gasket, a seal, a protective encasement, or other part or device. In some embodiments, the body 20 is a polymer body. In some instances, the body 20 consists essentially of a polymer material. In some instances, the body 20 comprises a polymer material. In particular, a polymer material can be disposed on one or more exterior surfaces of the body 20, such as on a substantially-flat, exterior surfaces 22.

In some embodiments, the polymer body 20 is a tacky polymer body, or a polymer body having tacky properties. Examples of tacky polymer materials include silicone rubber, latex rubber, synthetic latex rubber, and thermoplastic elastomers (TPE). In some instances, the body 20 consists essentially of one or more of these materials. In some instances, the body 20 comprises one or more of these materials. Accordingly, the polymer body 20 can have a tendency to stick to other objects, including other polymer bodies. This tendency to can lead the body 20 to stick to form clusters with other polymer bodies, particularly when the body 20 is very small. These clusters can be problematic in assembly and manufacturing processes that handled polymer bodies individually.

In some instances, the body 20 is very small. For example, in some configurations, the body 20 has volume less than or equal to 100 $mm^3$. In other configurations, the body 20 has volume less than or equal to 10 $mm^3$. In other configurations, the body 20 has volume less than or equal to 1 $mm^3$. In other configurations, the body 20 has volume less than or equal to 0.1 $mm^3$. In yet other configurations, the body 20 has volume less than or equal to 0.1 $mm^3$. Using another metric, in some instances, the body 20 has a total weight of less than or equal to 10 grams. In other instances, the body 20 has a total weight of less than or equal to 1 gram. In other instances, the body 20 has a total weight of less than or equal to 0.1 grams. In other instances, the body 20 has a total weight of less than or equal to 0.01 grams.

Occasionally, with very small and/or light-weight polymer bodies 20 the force of gravity on the polymer body 20 is less than the adhesive force between it and another polymer body 20. In these situations, the two polymer bodies 20 might stick together, even when vibrated, jostled, or otherwise agitated, as might be done in an assembly or manufacturing process. In some instances, agitation produces two to ten times the force of gravity on a polymer body 20. In one instance, the force of agitation is three times the force of gravity on a polymer body 20. In another instance, the force of agitation is two times the force of gravity on a polymer body 20.

The adhesive force between two polymer bodies 20 can be reduced by reducing the surface areas of the possible contact surface areas between the two bodies. Since the adhesive force between to tacky objects is dependent upon the contact surface area therebetween, the adhesive force can be reduced by reducing the contact surface area. If the contact surface is reduced so that the adhesive force therebetween is less than the force of gravity on either of the polymer bodies 20, then when agitated, the two bodies can separate. In other configurations, the contact surface can be reduced to be less than the force of agitation on either of the polymer bodies 20 so that they can separate when agitated or moved.

Figure 2:
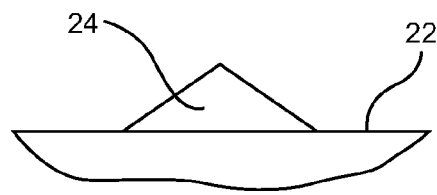
FIG. 2 illustrates a side view of the protrusion of FIG. 1.

The contact surface area of a surface can be reduced by disposing one or more small protrusions 24 thereon. For example, as shown in FIG. 1, by including one or more protrusions 24 on the substantially-flat, exterior surfaces of the polymer body 20, the contact surface can be reduced. FIG. 2 depicts a side view of one of the protrusions 24. As shown the protrusion 24 can form an angled point, such as would be formed by a pyramid-shaped protrusion.

Figure 3:
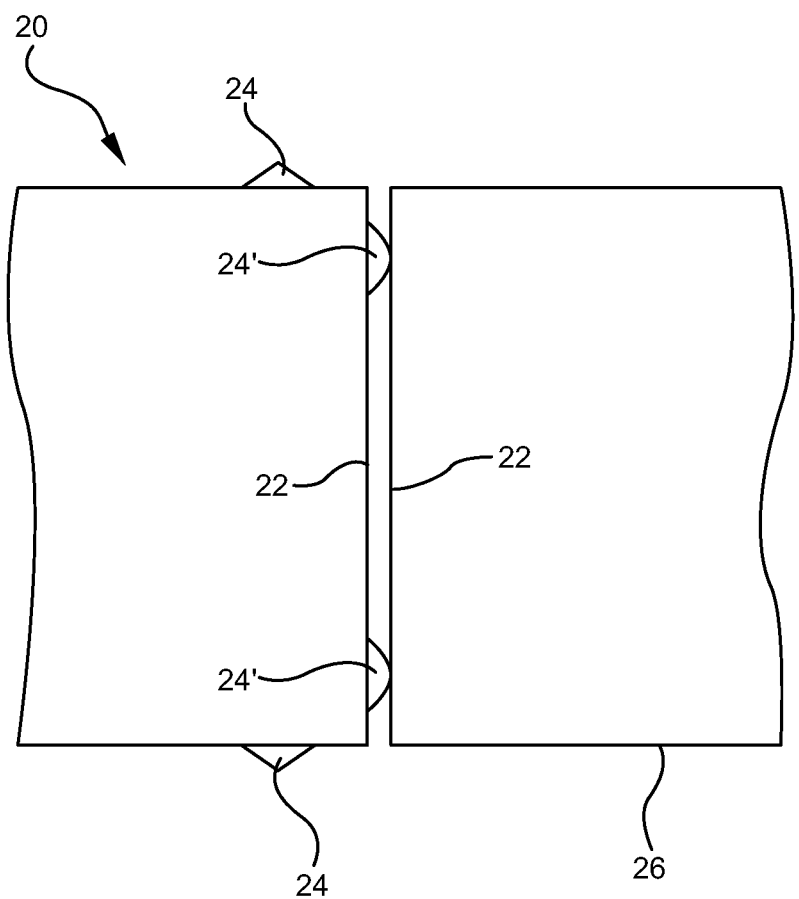
FIG. 3 illustrates a side view of a first polymer body that has protrusions in contact with a second polymer body.

FIG. 3 depicts a partial side view of the polymer body 20 in contact with a second polymer body 26. As can be recognized from this figure, absent the protrusions 24', the two substantially-flat, exterior surfaces 22 would be in contact. The contact area of such contact would be much larger than the contact area between the protrusions 24' and the second polymer body 26. In some embodiments, the adhesive force between the protrusions 24 and the substantially-flat, exterior surfaces 22 of the second polymer body 26 is less than the force of gravity on the first polymer body 20 or the second polymer body 26. In this situation, the first polymer body 20 and the second polymer body 26 would not adhere together.

As shown in FIG. 3, in some instances, as shown, one or more protrusion 24' becomes compressed to a degree when in contact with a second polymer body 26. In this instance, the contact surface area of the one or more protrusions 24 will increase. The selection of the dimensions of the protrusion 24 can take this into account. In some instances, a protrusion 24 will compress between 10 to 90 percent its non-compressed height. In other instances, a protrusion 24 will compress between 20 to 80 percent its non-compressed height. In other instances, a protrusion 24 will compress between 30 to 60 percent its non-compressed height. It will be understood that the degree of compression will vary based on the type of material that the protrusions 24 is made of, the shape and size of the protrusion 24, and the pressure against the protrusion 24.

Figure 4:
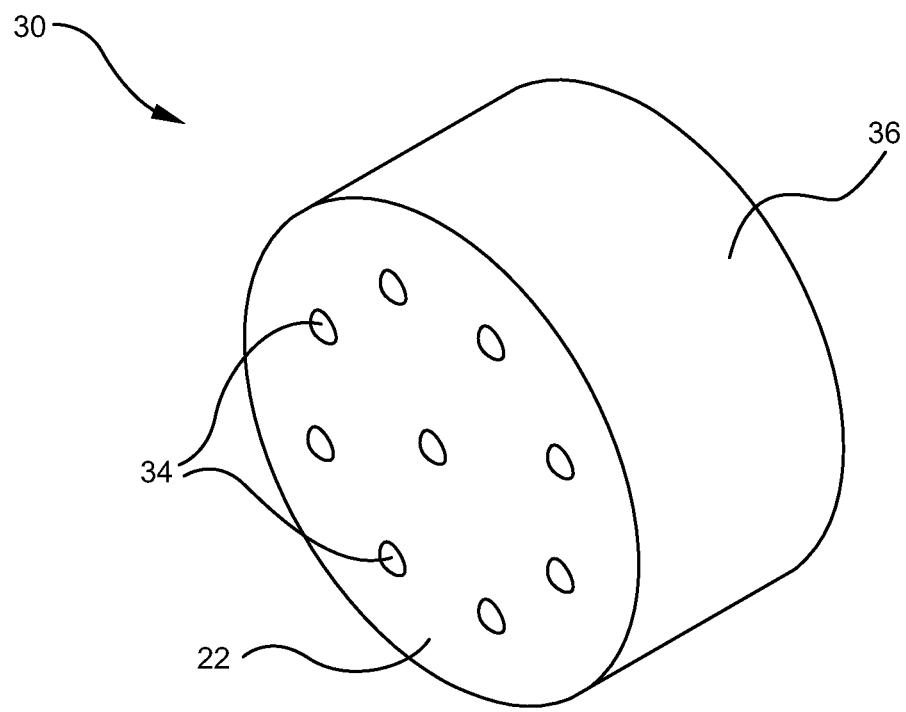
FIG. 4 illustrates a perspective view of a polymer body having a plurality of protrusions, according to some embodiments.

Referring to FIG. 4, which depicts a polymer body 30 having a substantially-flat, exterior surface 22. A plurality of protrusions 34 are disposed on the substantially-flat, exterior surface 22 to prevent this surface from contacting another such flat surface and sticking thereto. In some configurations, by evenly distributing the plurality of protrusions 24 across the substantially-flat, exterior surface 22, the protrusions 34 prevent a large portion of the substantially-flat, exterior surface 22 from contacting another flat surface. In some configurations, the plurality of protrusions 24 is arranged in one or more circles. In other configurations the plurality of protrusions 24 are arranged in columns, staggered columns, or patches.

Figure 5:
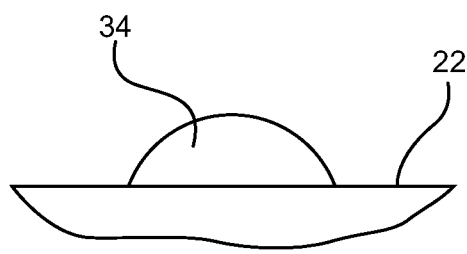
FIG. 5 illustrates a side view of the protrusion of FIG. 4.
Figure 6A:
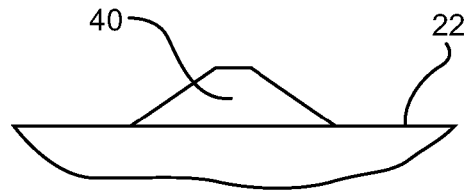
FIGS. 6A-6D illustrate side views of different embodiments of protrusions.
Figure 6B:
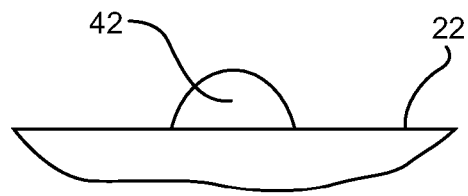
Figure 6C:
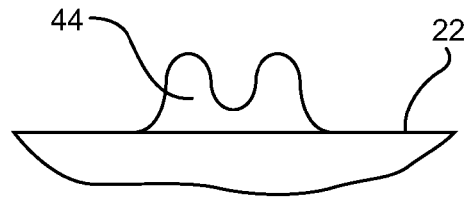
Figure 6D:
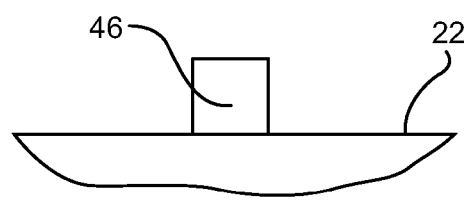
Figure 7A:
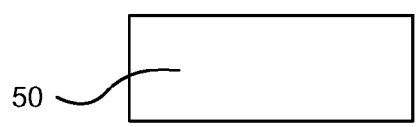
Figure 7B:
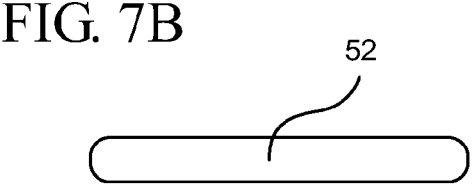
Figure 7C:
Figure 7D:
Figure 7E:
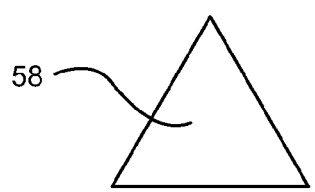
Figure 71F:
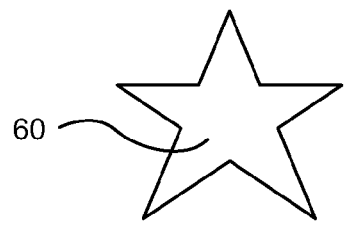

In some configurations, the one or more protrusions 34 are rounded. Referring to FIG. 5, which depicts a side view of the protrusions 34 of FIG. 4. As shown, the protrusions 34 are partial spherical protrusions that extend out and away from the substantially-flat, exterior surface 22. In some instances, spherical bumps have a radius between approximately 0.001 to 0.01 inches. In other instances, spherical bumps have a radius between approximately 0.002 to 0.008 inches. In other instances, spherical bumps have a radius between approximately 0.003 to 0.006 inches. In some embodiments, these and other protrusions extend away from the substantially-flat, exterior surface 22 a distance of between approximately 0.001 to 0.006 inches. In other embodiments, protrusions extend away from the substantially-flat, exterior surface 22 a distance of between approximately 0.001 to 0.004 inches. In other embodiments, protrusions extend away from the substantially-flat, exterior surface 22 a distance of between approximately 0.0025 inches.

The surface area of the substantially-flat, exterior surface 22 covered by a protrusion 34 is the footprint area, or simply footprint, of that protrusion 34. In some embodiments, the combined footprints of a set of protrusions 34 of a substantially-flat, exterior surface 22 is less than 10% the surface area of the substantially-flat, exterior surface 22. In other embodiments, the combined footprint areas are less than 7.5% the surface area of the substantially-flat, exterior surface 22. In other embodiments, the combined footprint areas are less than 5% the surface area of the substantially-flat, exterior surface 22. In other embodiments, the combined footprint areas are less than 2.5% the surface area of the substantially-flat, exterior surface 22. In yet other embodiments, the combined footprint areas are less than 1% the surface area of the substantially-flat, exterior surface 22.

The protrusions formed on a surface can have a variety of shapes, dimensions, and configurations. For example, FIGS. 6A to 6D depict side views of several different shaped protrusions 40, 42, 44, and 46. Similarly, FIG. 7A to 7F depict top views of several different shaped protrusions 50, 52, 54, 56, 58, and 60. It will be understood that a variety of other protrusions can be disposed on a substantially flat surface having other shapes, configurations, and dimensions.

In some configurations, to further reduce the adhesive force between adjacent polymer bodies, a lubricant or powder can be included on the polymer bodies.

As can be understood from the foregoing, the adhesive force between two polymer bodies can be reduced by, first, providing a first body having a substantially-flat exterior surface and providing a second body having a substantially-flat exterior surface. The first body and the second body can comprise a polymer material. Next, by providing one or more protrusions on the substantially-flat exterior surface of the first body, the adhesive force between the one or more protrusions and the substantially-flat exterior surface of the second body is less than the force of gravity on the first body or the second body. Thus, the adhesive force between the two bodies is reduced.

EXAMPLES

Figure 8:
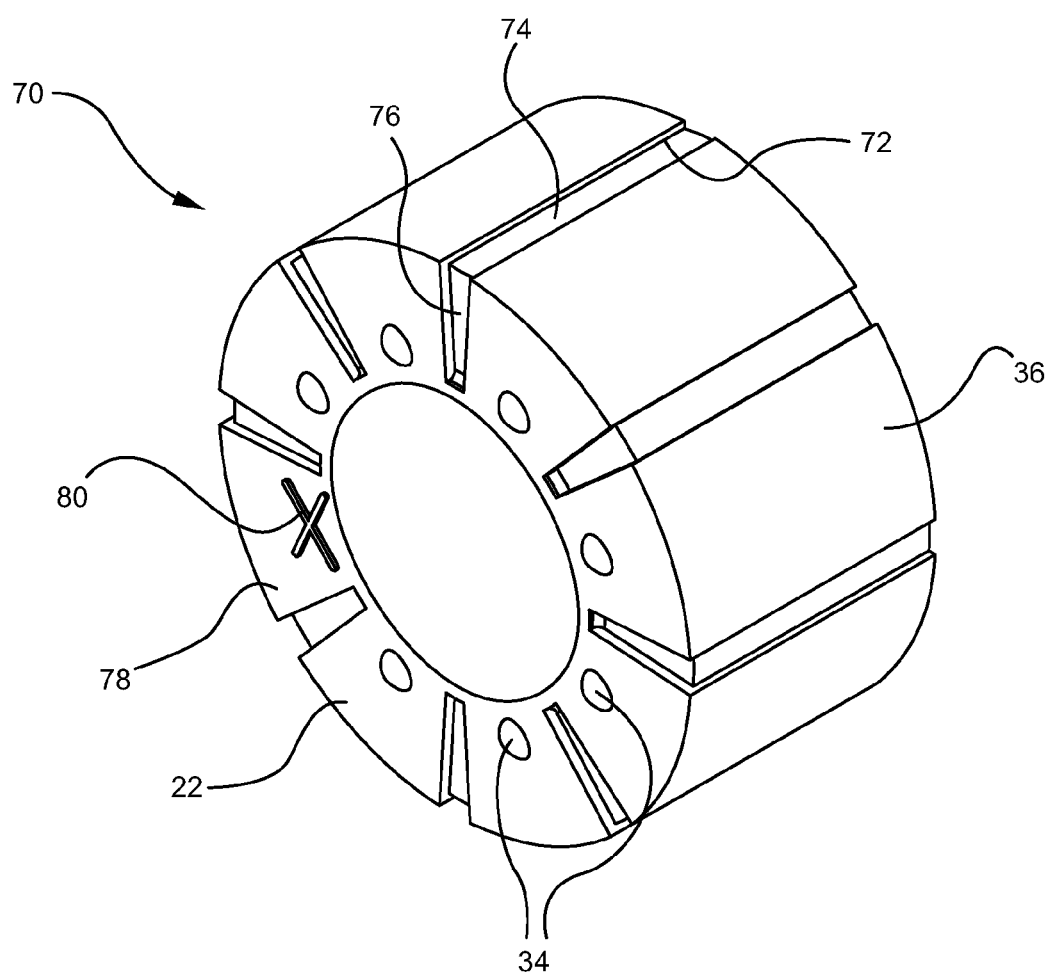
FIG. 8 illustrates a front perspective of a polymeric septum having protrusions, according to some embodiments.

The following examples illustrate the use of one or more protrusions of on polymer bodies and the results of that use. FIGS. 8-12 depict a rubber septum 70 that can be used as a valve in an intravenous catheter assembly to prevent blood flow out the end of the catheter. The septum 70 is a barrel-shape structure made of silicone rubber. The silicone rubber is tacky, being slightly sticky. FIG. 8 depicts a front perspective view of the septum 70 having a front side 78 that includes a substantially flat, exterior surface 22. The side surfaces 36 are rounded and have channels 72 formed therethrough. The channels 72 have front portions 76 and side portions 74. A circular set of seven partial-sphere protrusions 78 are disposed on the front surface 78 of the septum. Another protrusion 80 also disposed on the front side 72 has an x-shape.

Figure 9:
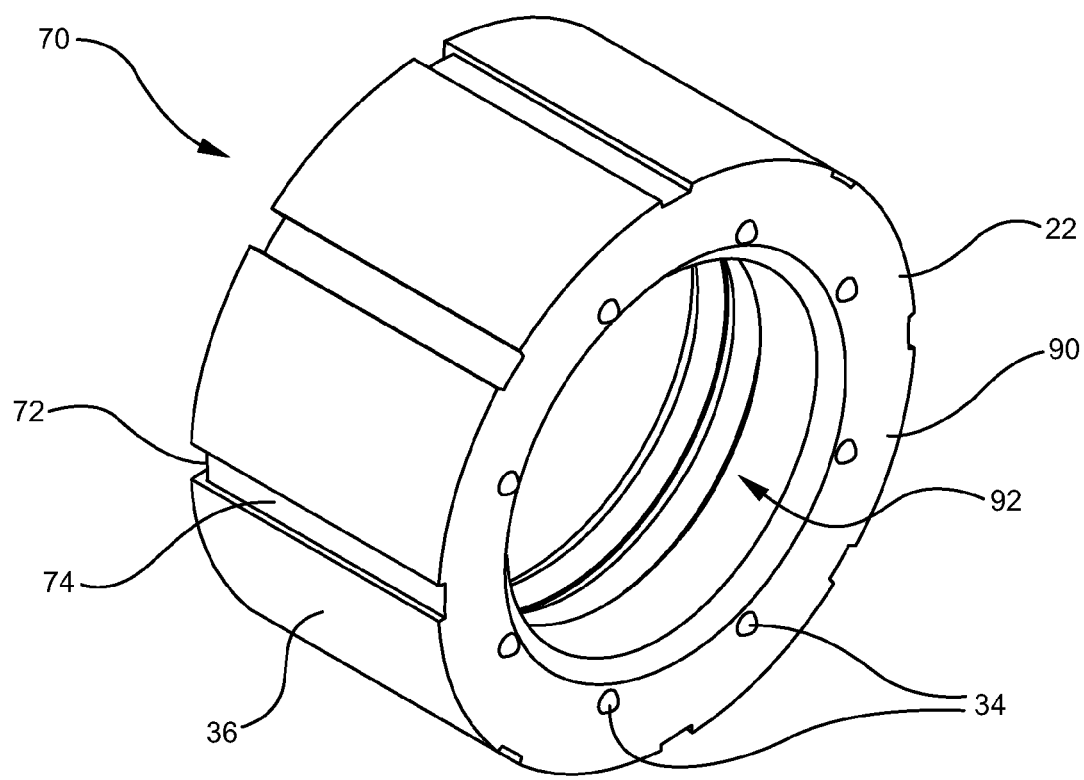
FIG. 9 illustrates a rear perspective of the polymeric septum of FIG. 8.
Figure 10:
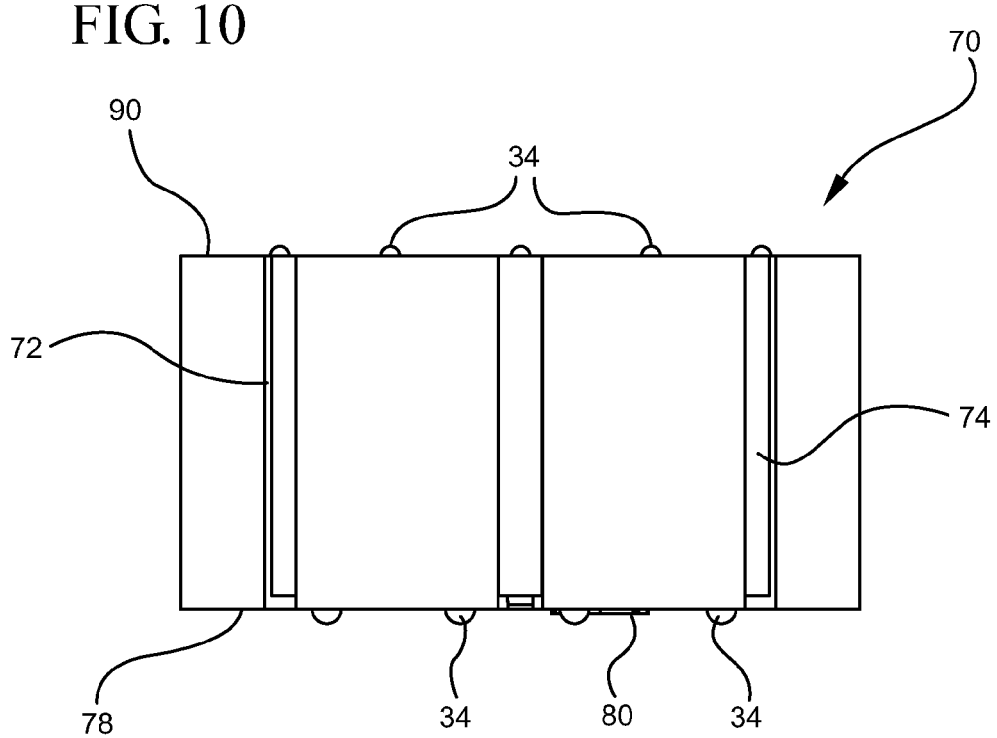
FIG. 10 illustrates a side view of the polymeric septum of FIG. 8.
Figure 11:
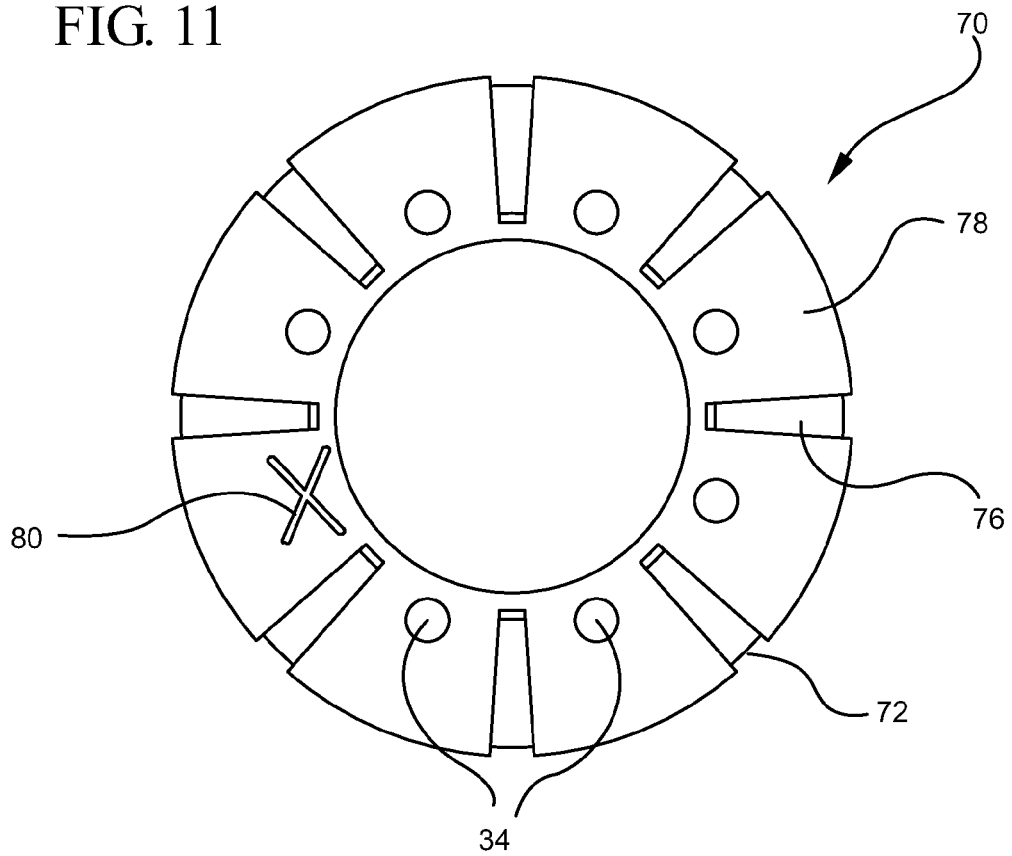
FIG. 11 illustrates a front view of the polymeric septum of FIG. 8.
Figure 12:
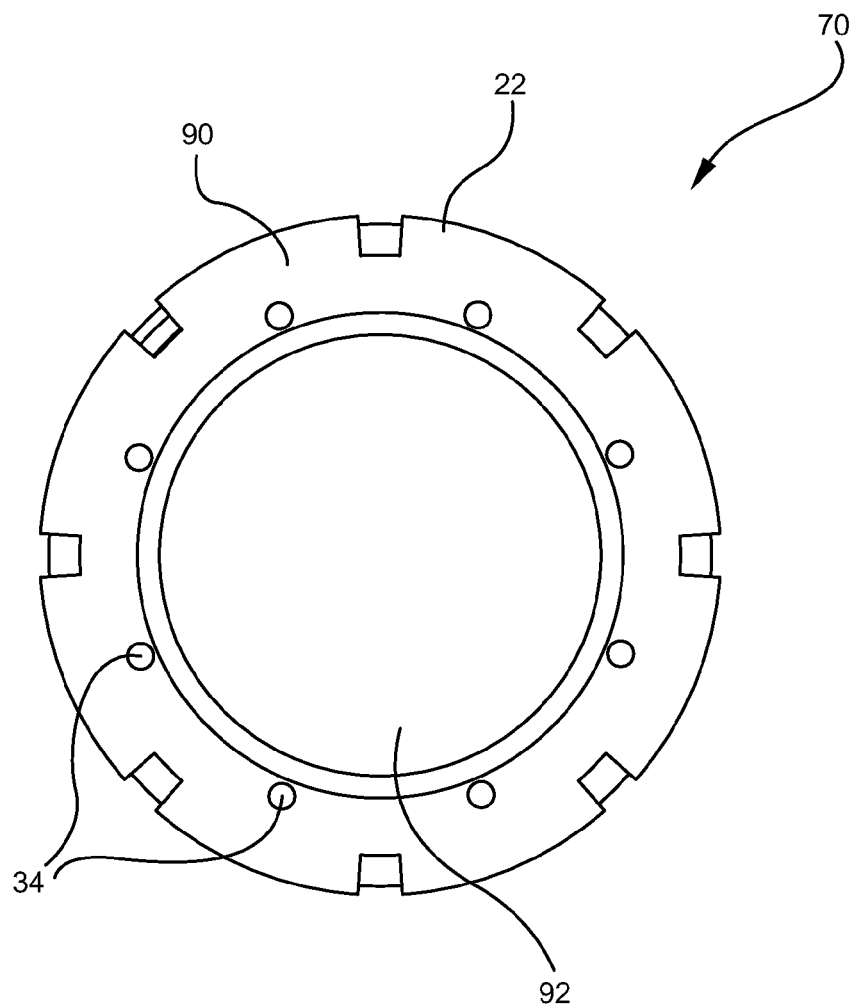
FIG. 12 illustrates a rear view of the polymeric septum of FIG. 8.

FIG. 9 depicts a rear perspective view of the septum 70. From this view an inner cavity 92 within the septum 70 is visible. The rear surface 90 is shown having a substantially flat, exterior surface 22. The substantially flat, exterior surface 22 has eight protrusions 34 thereon. FIG. 10 depicts a side view of the septum 70. FIG. 11 depicts a front view of the septum 70. FIG. 12 depicts a rear view of the septum 70.

The dimensions of the septum 70 are as follows: The septum 70 is approximately 0.08 inches thick and approximately 0.154 inches in diameter. The septum weighs 0.018 grams. The protrusions on the rear side are spherical bumps of 0.003 inches. The protrusions on the front side are spherical bumps of 0.006 inches radius. The protrusions each protrude 0.0025 inches. The rear substantially flat, exterior surface 22 end has a surface area of only 5.45 mm$^2$.

A set of septa 70 as shown in FIG. 8-12 without the protrusions 34 adhere to another like septum 70, also without protrusions 34, if either of the front or rear substantially flat, exterior surface 22 come in contact. When a substantially flat, exterior surface 22 contacts a side surface 36, the surfaces do not adhere since there is not sufficient contact area therebetween. Thus, in assembly, when multiple septa 708 are disposed in a common area, the septa 70 tend to stick together in clusters.

In one experiment, a septum similar to that illustrate and described with reference to FIGS. 8-12, but having no protrusions, was tested to determine if it would adhere to another septum. It was observed that the substantially flat, exterior surface 22 of the rear side 92, without protrusions 34, adhered to another rear substantially flat, exterior surface 22 of another septum 70 that also didn't have protrusions 34. Even when agitated and tumbled across other septa, the two septa 70 remained together. Based on this experiment, it can be seen that the adhesive force between the two septa 708 was at least 0.0033 grams force/mm$^2$, but was likely much higher because the two septa 70 remained together when agitated and tumbled across other septum.

In another experiment, the septum 70 having protrusions 34, as shown, was tested with another septum having protrusions 34 to determine if it would adhere to another septum having protrusions 34. The front surfaces 78 of each were placed together. As a result of this experiment, it was found that the two septa 70 did not remain in contact, but freely separated. It is determined that when the largest protrusions are compressed to approximately half its uncompressed height to present a total contact area of 0.44 mm$^2$. This area is for 16 bumps, eight from each septum, contacting the front surface 78 of the opposing septum 70. Based on this experiment, it can be seen that the adhesive force between the two septa was less than 0.041 grams force/mm$^2$, which is the force that would be required to keep the two surface areas together. Thus, the adhesive force between bodies of silicone rubber is between 0.0033 to 0.041 grams force/mm$^2$. Thus, in some embodiments, the adhesive force between tacky materials, such as tacky rubber materials, or other tacky materials is between approximately 0.0033 to 0.041 grams force/mm$^2$. In other embodiments, the adhesive force between tacky materials, such as tacky rubber materials, or other tacky materials is between approximately 0.01 to 0.04 grams force/mm², which account for the lack of separation in the first experiment when the two septa were tumbled and agitated.

From the foregoing, it can be seen that the inclusion of one or more protrusions on a substantially flat, exterior surface of a polymer body can reduce the contact surface between adjacent bodies and prevent the adhesion thereto.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A device comprising:
   a first polymer body having tacky properties, the first polymer body having a substantially-flat exterior surface, the first polymer body comprising a septum;
   one or more protrusions disposed on the substantially-flat exterior surface of the first polymer body, wherein when the one or more protrusions are in contact with a substantially-flat exterior surface of a second polymer body having tacky properties, the adhesive force between the one or more protrusions and the substantially-flat exterior surface of the second polymer body is less than the force of gravity on the first polymer body.

2. The device of claim 1, wherein the first polymer body is an elastomeric body.

3. The device of claim 1, wherein the adhesive force between a substantially-flat exterior surface of the first polymer body and a substantially-flat exterior surface of the second polymer body is between approximately 0.01 to 0.04 grams force/mm².

4. The device of claim 1, wherein the first polymer body comprises a material selected from a group consisting of silicone rubber, latex rubber, synthetic latex rubber, and a thermoplastic elastomer.

5. The device of claim 1, wherein the first polymer body consists essentially of a material selected from a group consisting of silicone rubber, latex rubber, synthetic latex rubber, and a thermoplastic elastomer.

6. The device of claim 1, wherein the one or more protrusions includes three or more protrusions.

7. The device of claim 1, wherein the one or more protrusions are rounded bumps.

8. The device of claim 1, wherein the one or more protrusions are form angled points.

9. The device of claim 1, wherein the first polymer body has a weight of less than 0.1 grams.

10. The device of claim 1, wherein the first polymer body has a weight of less than 0.01 grams.

11. The device of claim 1, wherein the substantially-flat exterior surface of the first polymer body has a surface area, and the one or more protrusions have a combined footprint with a surface area, wherein the surface area of the combined footprint of the one or more protrusions is less than 10% the surface area of the substantially-flat exterior surface of the first polymer body.

12. The device of claim 1, wherein the volume of the first polymer body is less than 0.1 mm³.

13. The device of claim 1, further comprising a lubricant disposed on the first polymer body.

14. A device comprising:
   a first polymer body having tacky properties, the first polymer body having a substantially-flat exterior surface, the first polymer body having a weight less than or equal to 10 grams; and
   one or more protrusions disposed on the substantially-flat exterior surface of the first polymer body, the one or more protrusions reducing the amount of the substantially-flat exterior surface of the first polymer body that is in contact with a substantially-flat exterior surface of a second polymer body having tacky properties to prevent the substantially-flat exterior surfaces of the first and second polymer bodies from sticking together.

15. The device of claim 14, wherein the first polymer body comprises a material selected from a group consisting of silicone rubber, latex rubber, synthetic latex rubber, and a thermoplastic elastomer.

16. A method for reducing adhesion between two polymer bodies, the method comprising:
   providing a first polymer body having a substantially-flat exterior surface, the first polymer body having a volume less than or equal to 100 mm³; and
   providing one or more protrusions on the substantially-flat exterior surface of the first polymer body, the one or more protrusions being spaced to reduce the amount of the substantially-flat exterior surface of the first polymer body that contacts a substantially-flat exterior surface of a second body to prevent the substantially-flat exterior surface of the first polymer body from sticking to the substantially-flat exterior surface of the second body.

17. The method of claim 16, wherein the first polymer body is an elastomeric body.

18. The method of claim 16, wherein the amount of the substantially-flat surface of the first polymer body that contacts the substantially-flat exterior surface of a second body is configured so that an adhesive force between the substantially-flat exterior surface of the first polymer body and the substantially-flat exterior surface of the second body is between approximately 0.01 to 0.04 grams force/mm².

19. The method of claim 16, wherein the first polymer body comprises a material selected from the group consisting of silicone rubber, latex rubber, synthetic latex rubber, and a thermoplastic elastomer.

* * * * *